United States Patent [19]

Glasford

[11] Patent Number: 4,611,819

[45] Date of Patent: Sep. 16, 1986

[54] LUGGAGE ATTACHMENT FOR WHEELCHAIR

[76] Inventor: Charles H. Glasford, 1005 S. 322nd Pl., Federal Way, Wash. 98003

[21] Appl. No.: 756,099

[22] Filed: Jul. 17, 1985

[51] Int. Cl.[4] .................................................. B62J 7/02

[52] U.S. Cl. ................................ 280/289 WC; 280/35; 297/194

[58] Field of Search ... 280/289 WC, 289 R, 242 WC, 280/202, 203, 35, 37, 650; 297/194, 188, DIG. 4; 24/232, 242

[56] References Cited

U.S. PATENT DOCUMENTS

| | | | |
|---|---|---|---|
| 1,300,681 | 4/1919 | Wissman | 280/203 |
| 2,441,997 | 5/1948 | Faulker | 280/289 WC |
| 2,596,055 | 5/1952 | Thomas | 280/289 WC |
| 3,405,954 | 10/1968 | Wolfe | 280/289 WC |
| 3,575,250 | 4/1971 | Dykes | 180/11 |
| 3,595,600 | 7/1971 | Stevens | 280/203 |
| 3,620,562 | 11/1971 | Sato | 24/232 |
| 4,288,124 | 9/1981 | Hamilton | 280/289 WC |
| 4,305,601 | 12/1981 | Berge | 280/289 WC |
| 4,511,157 | 4/1985 | Wilt | 280/289 WC |

FOREIGN PATENT DOCUMENTS

| | | | |
|---|---|---|---|
| 219223 | 7/1924 | United Kingdom | 280/203 |

*Primary Examiner*—John J. Love
*Assistant Examiner*—Everett G. Diederiks
*Attorney, Agent, or Firm*—Seed and Berry

[57] ABSTRACT

A stowable, wheelchair luggage attachment for towing wheeled luggage along one side of a wheelchair without interfering with the operation thereof. The attachment fits beneath the armrest of a wheelchair and has a forwardly mounted tow arm and a rearwardly mounted guide arm. The arms extend outwardly from the wheelchair, holding the tow strap and handle of the luggage so that the luggage is oriented in a parallel relation with the wheelchair direction of travel and outwardly away from the wheelchair driving wheel. The arms transfer forward and rearward motion of the wheelchair to the luggage. The arms are stowable beneath the armrest of the wheelchair when the attachment is not in use.

7 Claims, 5 Drawing Figures

LUGGAGE ATTACHMENT FOR WHEELCHAIR

DESCRIPTION

1. Technical Field

The invention relates to an apparatus and method for allowing disabled persons to transport wheeled luggage without assistance. More specifically, the invention relates to an apparatus and method for towing wheeled luggage of a type having a handle on top of the luggage and a hand strap at one end thereof, along one side of the wheelchair and parallel to the direction of travel of the wheelchair.

2. Background Art

Various attachments for wheelchairs, including walkers, carts and transfer stools, are available. These devices are cumbersome, unwieldy, and are not well adapted for transporting luggage. Furthermore, most of these devices cannot be retracted into a stowed position on the wheelchair which would allow the occupant to travel unfettered in airplanes, vehicles or public areas designed for handicapped access when not transporting luggage. Thus, a great need exists for a device which would allow wheelchair occupants to transport luggage without assistance and which would allow wheelchair occupants to travel unfettered in airplanes, vehicles and areas designed for handicapped access when the device is not in use.

3. Disclosure of the Invention

Thus, it is an object of the invention to provide a luggage towing device which allows a wheelchair occupant to conveniently transport wheeled luggage without assistance.

It is also an object of the invention to provide a luggage towing device which does not interfere with the operation of the wheelchair when in use.

It is yet another object of the invention to provide a luggage towing device which is unobtrusive when not in use.

It is a further object of the invention to provide a luggage towing device which is readily adapatable to a standard wheelchair.

The invention achieves these objectives by providing a stowable, wheelchair luggage towing attachment which holds wheeled luggage of the type having a hand strap and a handle in a position alongside a wheelchair, and oriented parallel to the direction of travel of the wheelchair. The attachment does not interefere with the normal operation of the wheelchair when in use and stows away beneath the arm of the wheelchair when not in use.

In one embodiment, the attachment has an elongated body which is adapted to fit beneath an arm of a typical wheelchair. The body has means for attaching to the standard mounting holes for the wheelchair armrest. A tow arm is pivotably attached to the forward end of the body and can be pivoted to a laterally extended position for towing luggage to one side of the wheelchair, and a stowed position folded beneath the arm of the wheelchair when not in use. The body has means for locking the tow arm against substantial rearward movement when the tow arm is in the extended position so that the tow arm can transfer forward movement from the wheelchair to the luggage. Means are provided on one end of the tow arm for attaching the hand strap of conventional luggage.

A guide arm is also pivotally attached to the body. The guide arm may be moved into a laterally extended position for maintaining the parallel alignment of the luggage with the wheelchair, beside the wheelchair, and a stowed position folded beneath the arm of the wheelchair along with the tow arm when not in use. Means are provided on the body for locking the guide arm against substantial forward or rearward motion when the guide arm is in the extended position. Thus, in addition to maintaining the parallel alignment of the luggage to the directional travel of the wheelchair and the spacing of the luggage from the wheelchair, the guide arm can also transfer forward or rearward motion of the wheelchair to the luggage. Means are provided on the end of the guide arm for releasably attaching the guide arm to the handle of the luggage.

The tow arm is pivotable in a direction such that when the body is attached to a wheelchair in the described manner and the tow arm is in the extended position, the tow arm and the body define a horizontal reference plane. In one embodiment, the guide arm is bent out of the reference plane so that luggage which is shorter than the height of the wheelchair arm can be engaged with the guide arm. The body can also be provided with means for vertically adjusting the height of the guide arm relative to the reference plane so that variously sized luggage can be engaged by the guide arm.

BEST MODE FOR CARRYING OUT THE INVENTION

Figures 1, 2:
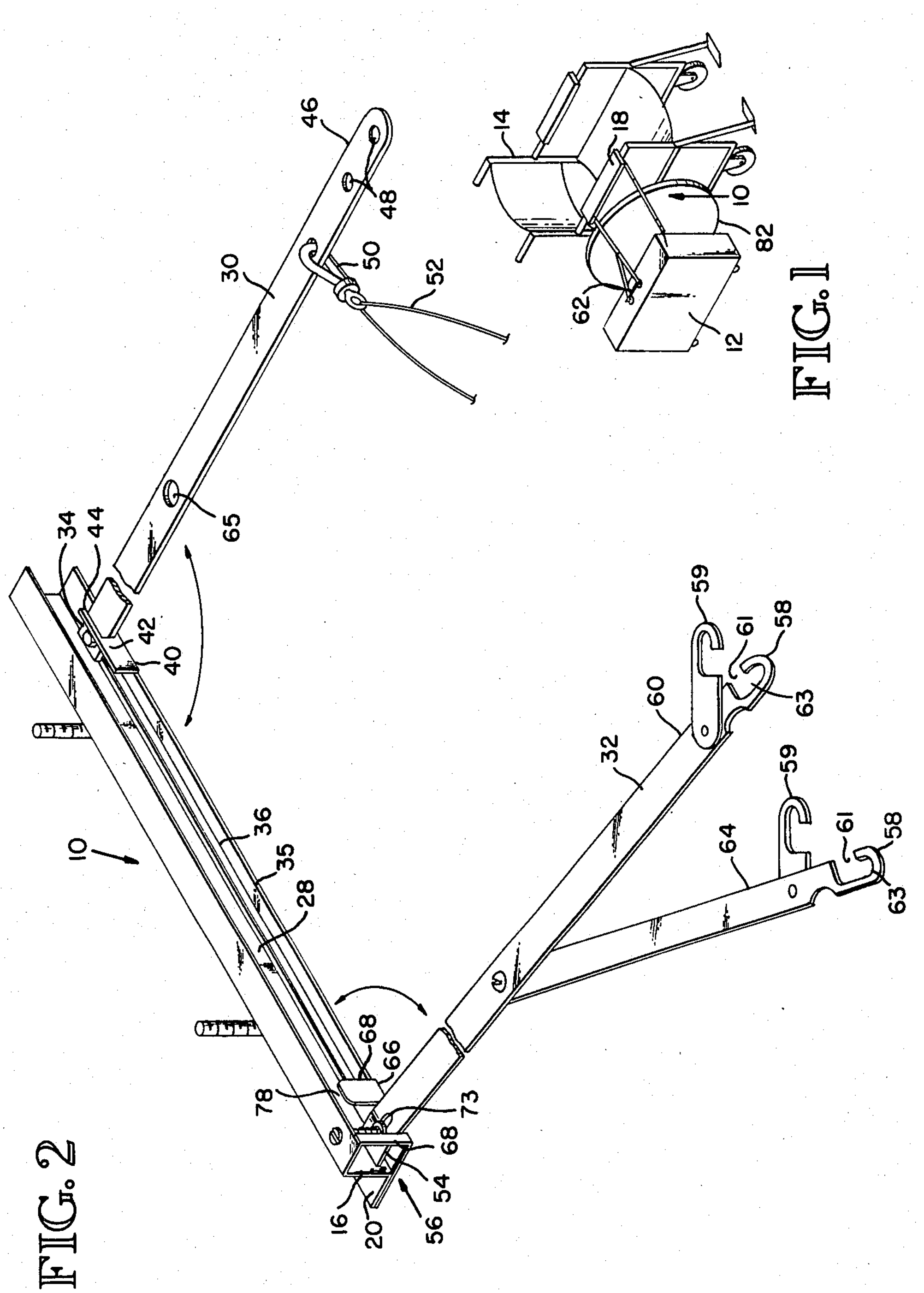
FIG. 1 is an isometric view of a conventional wheelchair utilizing the luggage towing attachment of the present invention to tow a piece of conventional wheeled luggage.
FIG. 2 is an enlarged isometric view of the luggage towing attachment of FIG. 1 showing the tow arm and the guide arm of the attachment in the extended position.

Referring now in detail to the drawings, the numerals herein refer to like numbered parts in the drawings.

As shown in FIG. 1 for purposes of illustration, the present invention is embodied in a luggage towing attachment 10 for a wheelchair. The attachment is shown towing a conventional piece of wheeled luggage 12 using a conventional wheelchair 14.

Figure 3:
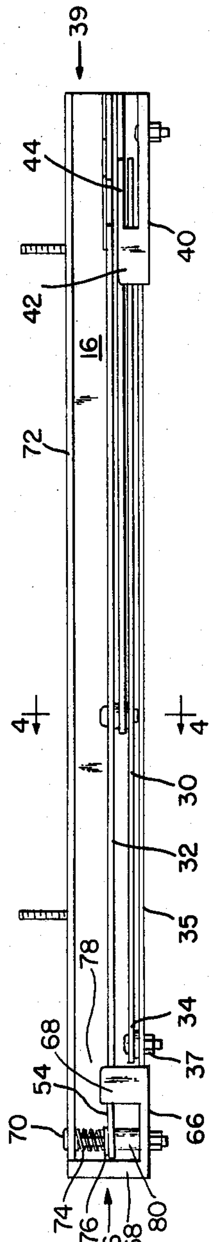
FIG. 3 is an enlarged side elevational view of the luggage towing attachment with the guide arm and the tow arm shown in the stowed position.
Figure 4:
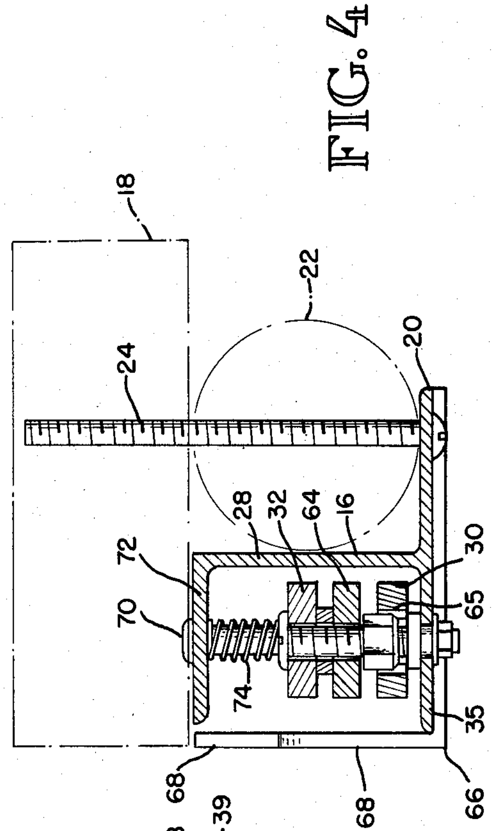
FIG. 4 is a sectional view of the luggage towing attachment taken substantially along the line 4—4 of FIG. 3, shown connected to a conventional wheelchair armrest and frame member illustrated in broken lines.

A detailed view of the attachment 10 is provided in FIGS. 2–4. The attachment has a body portion 16 which is adapted to fit generally beneath an armrest 18 of the wheelchair 14. The body portion has attached thereto a laterally inwardly extending flange 20 which extends below a tubular frame member 22 of the wheelchair 14 which supports the armrest 18. Screws 24, or other suitable fastening devices, are provided to secure the flange 20 to the underside of the tubular frame member 22 so that the body portion 16 is in substantial alignment with the armrest and with the straight line travel of the wheelchair. The screws 24 extend through the flange 20 and the tubular frame member 22, and are anchored into the armrest 18. The screws 24 also serve to fasten the armrest to the frame member.

The body portion 16 is also provided with a longitudinally extending, interior stowage channel 28. The stowage channel has a forward open end and a longitudinal portion which opens laterally outward and which is adapted to receive therein a tow arm 30 and a guide arm 32 when the tow arm and the guide arm are folded for storage within the stowage channel.

Figure 5:
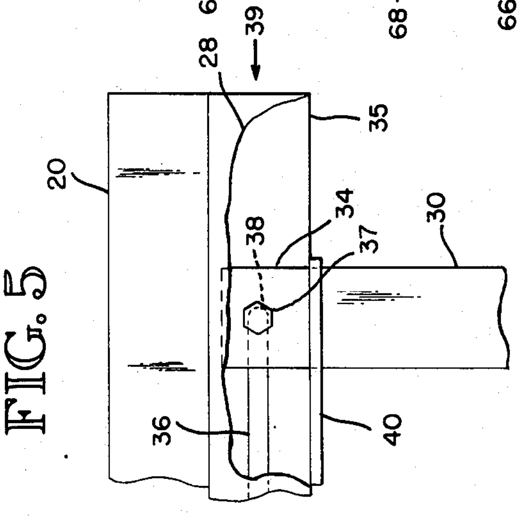
FIG. 5 is an enlarged, partial top plan view of the foreward end of the attachment with a portion cut away to reveal the locking relation of the tow arm and the closed end of a slot portion of the attachment.

The tow arm 30 has an attached end portion 34 extending into the stowage channel 28 and pivotably attached therein to the body portion 16. A lower wall 35 of the body portion defining the stowage channel 28 has a centrally positioned, longitudinally extending slot 36. A two-headed pivot pin 37 extends through the attached end portion 34 of the tow arm 30 and the slot, allowing the tow arm to pivot about the pin and the pin to slide freely along the slot. As seen in FIG. 5, the slot 36 has a closed end 38 located toward a forward end 39 of the body portion 16. A tow arm stop 40 is provided outwardly of the slot and prevents substantial rearward movement of the tow arm when the tow arm is in the extended position. The closed end 38 is positioned relative to the stop 40 such that when the pivot pin 37 is moved forward against the closed end of the slot and the tow arm is engaged by the stop to prevent rearward movement of the tow arm, the tow arm is locked in a positon extending substantially perpendicular to the body portion 16. Thus, forward motion of the wheelchair 14 is transferred through the attachment 10 to the luggage 12.

The tow arm stop 40 is attached to the lower wall 35 of the body portion 16. The tow arm stop also has an upwardly projecting portion 42 for engaging the tow arm when the tow arm is in the extended position. The tow arm stop further includes a retainer portion 44 extending forward from the stop portion 42 and positioned above the tow arm when the arm is in the extended position. Thus the tow arm is restrained from substantial vertical movement when in the extended position. The retainer portion 44 fits closely above the tow arm to prevent the tow arm (during use) from moving upwardly sufficiently to rise above the stop portion 42 and pivot rearwardly.

When the tow arm is in the locked extended position due to the engagement of the tow arm with the tow arm stop 40 and the upwardly projecting portion 42 the tow arm extends substantially parallel to the ground when the attachment 10 is attached to a wheelchair (shown in FIG. 1). The tow arm 30 is pinned sufficiently tight by the pivot arm 37 to be held in this substantially horizontal position against downward deflection. The lower wall member 35 of the stowage channel 28 also cooperates with the pin to maintain the horizontal position of the tow arm.

The tow arm 30 is shown in the stowed position in FIG. 2. To move the tow arm 30 into the stowed position, the tow arm is pivoted forward out of engagement with the tow arm stop 40 until positioned to extend substantially colinearly with the body portion 16. The tow arm is then pushed rearwardly to cause the pivot pin 37 to slide along the slot 36. The slot 36 has a length such that the tow bar 30 may be pushed sufficiently rearward to be contained entirely within the stowage channel 28 in the body portion 16.

The tow arm 30 also has a free end portion 46 with a plurality of longitudinally spaced holes 48 therein for attachment of a removable spring clip 50 connected to a conventional tow strap 52. The holes 48 are spaced to provide adjustment of the distance with which the luggage being towed will be spaced from the sides of the wheelchair 14. Although a clasp 50 and cooperating holes 48 are described, any suitable means for attaching the tow strap 52 to the tow arm 30 may be provided, including clips or grooves, preferably providing for adjustment of the luggage spacing.

The guide arm 32 has an attached end portion 54 extending into the stowage channel 28 and pivotally attached therein to the lower wall 35 of the body portion 16 towards a rearward end 56 of the body portion. The guide arm 32 is movable between a stowed position (shown in FIG. 3) within the stowage channel 28 and a locked extended position for guiding the luggage 12 (shown in FIG. 2). The guide arm 32 and the tow arm 30 are substantially equal in length so that the luggage will be maintained in a substantially parallel orientation to the straight line travel of the wheelchair when the attachment 10 is in use. A releasable clip 58 or other means may be provided at a free end portion 60 of the guide arm 32. The releasable clip is sized to grasp a handle 62 of the luggage. The clip 58 has pivotally attached clasp 59 which can enclose a passageway 61 accessing a central opening 63 defined by the shape of the clip 58. The clasp 59 is closed around one of the spaced-apart shank of a luggage handle to secure the handle therein. In the presently preferred embodiment of the invention, a stabilizer arm 64 is pivotally attached to a midportion of the guide arm 32 and provided with a clip 58 and a clasp 59 at its free end so that the clips of the guide arm and stabilizer arm may engage the respective spaced-apart shank portions of the luggage handle 62. A small hole 65 can be provided in the tow arm 30 to receive any downward extension of the stablizer arm pivot which may extend below the stablizer arm such that the arms will nest properly when in the storage channel. If the means for pivoting the stablizer arm is flush with the bottom of the stablizer arm; a small hole 65 need not be provided in tow arm.

The body portion 16 is also provided with a guide arm stop 66 attached to the lower wall 35 of the body portion 16 to lock the guide arm 32 against substantial forward or rearward movement when the guide arm is in the extended position. The guide arm stop 66 includes a pair of upwardly projecting stop portions 68 spaced apart sufficiently for the guide arm 32 to be positioned therebetween and to be engaged by the stop portions for preventing forward or rearward movement of the guide arm. Thus, in addition to maintaining the proper orientation of the luggage, the guide arm 32 transfers either forward or rearward motion of the wheelchair 14 through the attachment 10 to the handle 62 of the luggage 12.

As best shown in FIGS. 3 and 4, the attached end portion 54 of the guide arm 32 is pivotally attached to the body portion 16 by a pivot pin 70. The pivot pin 70 allow substantial vertical angular movement of the guide arm 32 relative to the body portion 16 to permit the guide arm to be moved upward sufficiently to clear the forward one of the guide arm stop portions 68 so that the guide arm may be moved from the extended position into the stowed position. To do so, the guide arm 32 is merely lifted angularly upward and pivoted forward to fold the guide arm into the stowage channel 28. In the presently preferred embodiment, this vertical angular movability is achieved by extending the pivot pin 70 between an upper wall 72 of the body portion 16 and the lower wall 35, and providing a longitudinally elongated slot 73 in the guide arm which allows the guide arm to be tilted angularly upward sufficiently to clear the top of the forward one of the guide arm stop portions 68. A spring 74 is coaxially mounted on the pivot pin 70 above the guide arm 32 with a washer 76 positioned therebetween. The spring 74 bears down on the guide arm such that the guide arm is biased into the locked position between the guide arm stop portions 68. The upward reach of the forward one of the guide arm stop portions 68 terminates below the upper wall 72 of the body portion 16 to provide a gap 78 through which the guide arm 32 may pass when moved between the stowed and the extended positions without interference from the guide arm stop portions 68.

The guide arm 32 is provided with a downward bend towards the attached end portion 54 such that when the guide arm is in the extended position, the guide arm extends outwardly and downwardly to accommodate attachment of the clips 58 and clasps 59 on the free ends of the guide arm and the stabilizer arm 64 to the handle 62 of luggage 12 which is substantially below the elevation of the attachment 10. With the vertical angular movability provided to the guide arm 32, as described above, various height luggage may be accommodated while substantial forward or rearward motion of the guide arm 32 is prevented. To facilitate the vertical angular movement of the guide arm 32, the guide arm is mounted atop a ferrule 80 which is coaxially mounted on the pivot pin 70.

The tow arm 30 and the guide arm 32 are sufficiently spaced apart on the body 16 when in the extended position to allow a wheelchair occupant to operate the wheelchair 14 in the conventional manner.

As shown in FIGS. 3 and 4, the tow arm 30 and the guide arm 32 nest within the stowage channel 28 when each is moved into the stowed position. The attachment 10, thus constructed, is unobtrusive when not in use and does not interfere in any way with the normal operation of the wheelchair 14. Furthermore, as shown in FIG. 1, the tow arm 30 and the guide arm 32 are of a length to space the towed luggage 12 sufficiently to one side of the wheelchair so as not to inhibit a wheelchair occupant from rotating the wheelchair driving wheel 82 in a conventional manner.

The wheelchair luggage towing attachment herein described provides a wheelchair occupant with a device which is readily adaptable to conventional wheelchairs, which is stowable when not in use, and which does not interfere with the operation of the wheelchair when the attachment is used to tow luggage. The guide arm 32 is provided with sufficient vertical freedom of movement, even when in the extended position where restrained against substantial forward or rearward motion by the guide arm stop 66 to adapt to a variety of luggage heights. Thus, the attachment provides a practical solution for the handicapped traveler, allowing self-sufficiency in regard to transporting luggage.

Other embodiments and functional equivalents of the attachment are contemplated. For example, the tow arm 30 and the guide arm 32 need not be pivotally attached to the body 16 but may be selectively attachable to the body in an extended position and detachable from the body for placement in a stowed position within the body. Therefore, the attachment is not to be limited according to the above description but is to be defined by the scope of the claims which follow.

I claim:

1. A stowable, wheelchair luggage towing attachment for towing wheeled luggage along one side of a wheelchair without interfering with the operation of the wheelchair, comprising:

an elongated body having forward and rearward ends and means for connecting the body to the underside of an arm of a wheelchair;

a tow arm having a free end portion and an attached end portion, the free end portion having means for connecting a luggage tow strap thereto, the attached end portion having means for connecting the tow arm to the body so that the tow arm can assume an extended position in a laterally outward direction;

means on the body for holding the tow arm in the extended position and against substantial rearward movement relative to the body so that forward motion of the wheelchair is transferred through the body to the luggage tow strap;

a guide arm having a free end portion and an attached end portion, the free end portion having means for connecting a luggage handle thereto and for orienting the luggage in a substantially parallel direction with the straight line travel of the wheelchair, the attached end portion having means for connecting the guide arm to the body so that the guide arm can assume an extended position in the laterally outward direction, the body having longitudinally extending upper and lower walls defining an interior longitudinally extending stowage channel opening in the laterally outward direction, sized to accept the tow arm and guide arm therein in retracted positions;

means on the body for holding the guide arm in the extended position and against substantial forward and rearward movement.

2. The attachment of claim 1 wherein the connecting means for the tow arm and guide arm pivotally connect the tow arm and the guide arm to the body so that each arm pivots from the extended position to the retracted position.

3. The attachment of claim 2 wherein the lower wall has a substantially coextensive slot slidably receiving the tow arm connecting means and wherein the tow arm holding means comprises a tow bar stop connected to the underside of the lower wall towards the forward end of the body and wherein the forward end of the body is open, the tow arm stop having an upwardly projecting stop portion and a forwardly extending retainer portion spaced above the lower wall, the lower wall, upwardly projecting portion and the retainer portion defining a recess adapted to closely accept the tow arm, preventing substantial rearward and vertical movement thereof relative to the body, the tow arm being forwardly pivotable away from the recess into longitudinal alignment with the body and rearwardly slidable into the stowed position.

4. The attachment of claim 3 wherein the guide arm connecting means further pivotally connects the guide arm to the body in a vertical plane, and wherein the guide arm holding means comprises a pair of upwardly extending stop portions connected to the lower wall of the body towards the rearward end, the rearwardmost stop extending from the lower wall to the upper wall, the forwardmost stop extending upwardly from the lower wall towards the upper wall, leaving a gap therebetween sized to allow the guide arm to pivot vertically and horizontally into a recess formed by the stops, the stops being spaced to closely receive the guide arm therebetween to prevent substantial forward and rearward movement of the guide arm when in the extended position.

5. The attachment of claim 4 wherein the guide arm connecting means further includes means for vertically biasing the guide arm into the guide arm holding means recess when the guide arm is in the extended position.

6. A stowable, wheelchair luggage towing attachment for towing wheeled luggage having a tow shank handle along one side of a wheelchair without interfering with the operation of the wheelchair, comprising:

an elongated body having forward and rearward ends and means for connecting the body to the underside of an arm of a wheelchair;

a tow arm having a free end portion and an attached end portion, the free end portion having means for connecting a luggage tow strap thereto, the attached end portion having means for connecting the tow arm to the body so that the tow arm can assume an extended position in a laterally outward direction;

means on the body for holding the tow arm in the extended position and against substantial rearward movement relative to the body so that forward motion of the wheelchair is transferred through the body to the luggage tow strap;

a guide arm having a free end portion and an attached end portion, the free end portion having means for connecting a luggage handle thereto and for orienting the luggage in a substantially parallel direction with the straight line travel of the wheelchair, the attched end portion having means for connecting the guide arm to the body so that the guide arm can assume an extended position in the laterally outward direction, the guide arm luggage handle connecting means including a stabilizer arm pivotally attached to a midsection of the guide arm and elongated so that an engagement portion of the stablizer arm can engage one shank of the luggage handle and further including a free end luggage handle connecting means of the guide arm for simultaneously engaging the remaining shank;

means on the body for holding the guide arm in the extended position and against substantial forward and rearward movement.

7. The attachment of claim 6 wherein the free end luggage handle connecting means and the engagement portion of the stabilizer arm comprise integral clips having central openings sized to receive said luggage handle shanks and a passageway accessing the central opening, each clip further having pivotally attached clasps which close the passageway, preventing movement of the shanks out of the central openings.

* * * * *